United States Patent [19]
Kawasaki et al.

[11] Patent Number: 5,461,273
[45] Date of Patent: Oct. 24, 1995

[54] METHOD AND AN APPARATUS FOR CONTROLLING A MOVING VELOCITY OF AN ULTRASONIC MOTOR

[75] Inventors: Osamu Kawasaki, Kyoto; Masanori Sumhara, Higashiosaka; Tetsuro Ohtsuchi, Osaka; Takahiro Nishikura, Ikoma; Takashi Nojima, Katano, all of Japan

[73] Assignee: Matsushita Electric Industrial Co., Ltd., Kadoma, Japan

[21] Appl. No.: 167,498

[22] Filed: Dec. 15, 1993

[30] Foreign Application Priority Data

Dec. 16, 1992 [JP] Japan ................... 4-335726

[51] Int. Cl.⁶ ........................... H01L 41/08
[52] U.S. Cl. ........................... 310/316; 318/116
[58] Field of Search ............... 310/323, 328, 310/316, 317; 318/116

[56] References Cited

U.S. PATENT DOCUMENTS

| | | | |
|---|---|---|---|
| 4,727,276 | 2/1988 | Izukawa et al. | 310/316 |
| 4,794,294 | 12/1988 | Shimizu et al. | 310/316 |
| 4,853,579 | 8/1989 | Kawasaki et al. | 310/116 |
| 4,914,337 | 4/1990 | Takagi | 310/316 |
| 4,926,084 | 5/1990 | Furutsu et al. | 310/316 |
| 5,001,404 | 3/1991 | Kataoka | 318/116 |
| 5,013,982 | 5/1991 | Sasaki | 310/316 X |
| 5,062,622 | 11/1991 | Kataoka | 310/323 X |
| 5,130,619 | 7/1992 | Izuno | 318/116 |
| 5,159,253 | 10/1992 | Shimizu et al. | 318/606 |
| 5,198,714 | 3/1993 | Salomon et al. | 310/323 |

FOREIGN PATENT DOCUMENTS

| | | |
|---|---|---|
| 2101975 | 4/1990 | Japan . |
| 3239168 | 10/1991 | Japan . |
| 4222476 | 8/1992 | Japan . |
| 9108594 | 6/1991 | WIPO . |

OTHER PUBLICATIONS

Search Report for European Appl. 93120292.3, mailed Mar. 29, 1994.

Aoyagi et al, "Development of Fast and Fine Position Control System of an Ultrasonic Motor," Dec. 1991, pp. 254–256, Jpn. J. Appl. Phys. vol. 31 (1992).

*Primary Examiner*—Mark O. Budd
*Attorney, Agent, or Firm*—Renner, Otto, Boisselle & Sklar

[57] ABSTRACT

A method for controlling a moving velocity of an ultrasonic motor comprising a vibration body for causing ultrasonic vibration in response to two AC driving voltage signals having a common frequency, a common amplitude and phases different from each other; and a moving body in contact with the vibration body and moved by the ultrasonic vibration. The method includes step A of detecting a velocity of the moving body; step B comparing the velocity detected in step A with a predetermined velocity; and step C for adjusting the frequency of the two AC driving voltage signals and the amplitude of or the phase difference between the two AC driving voltage signals, based on the comparison result to allow the velocity of the moving body to be closer to the predetermined velocity.

26 Claims, 9 Drawing Sheets

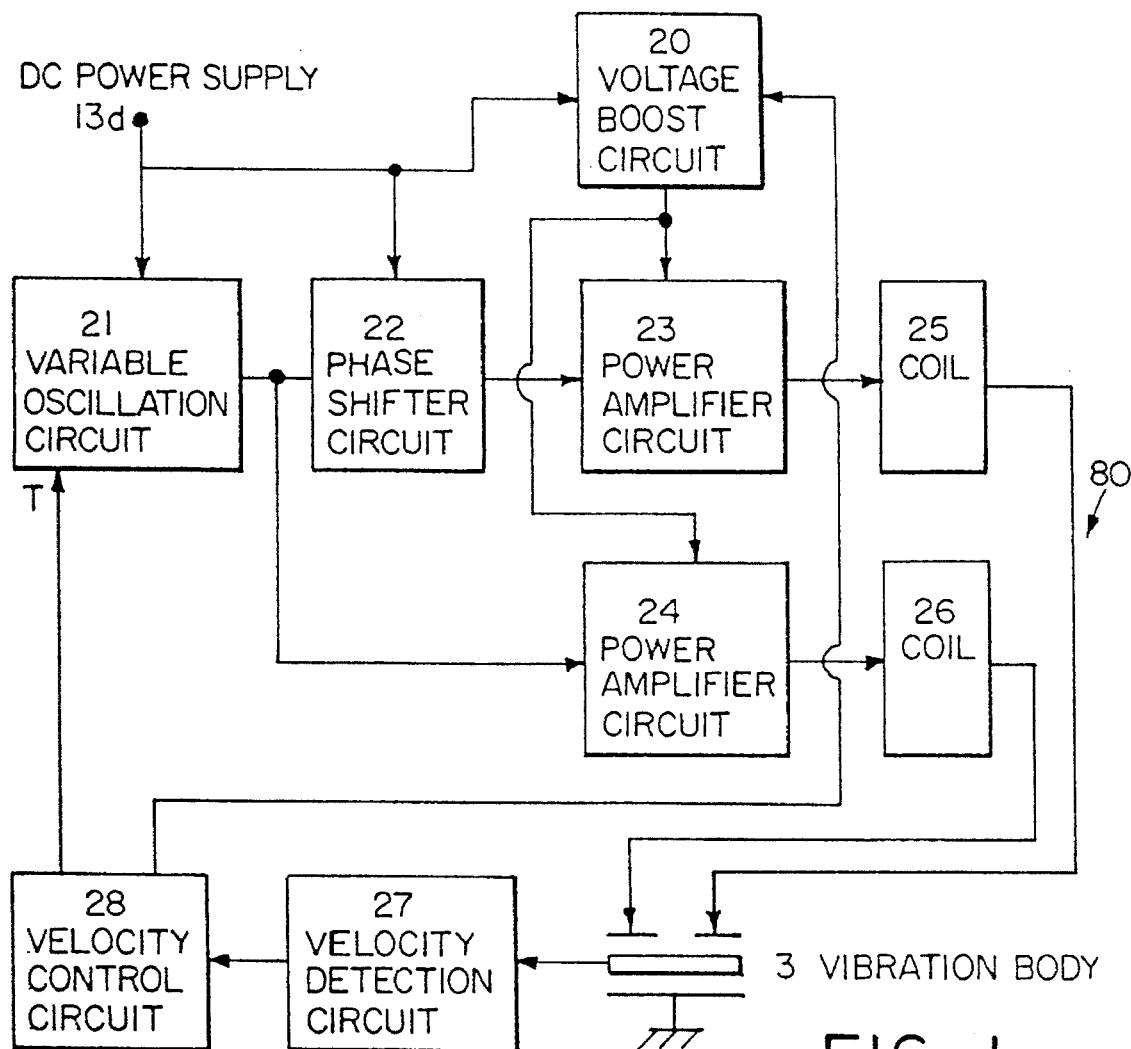
FIG. 1
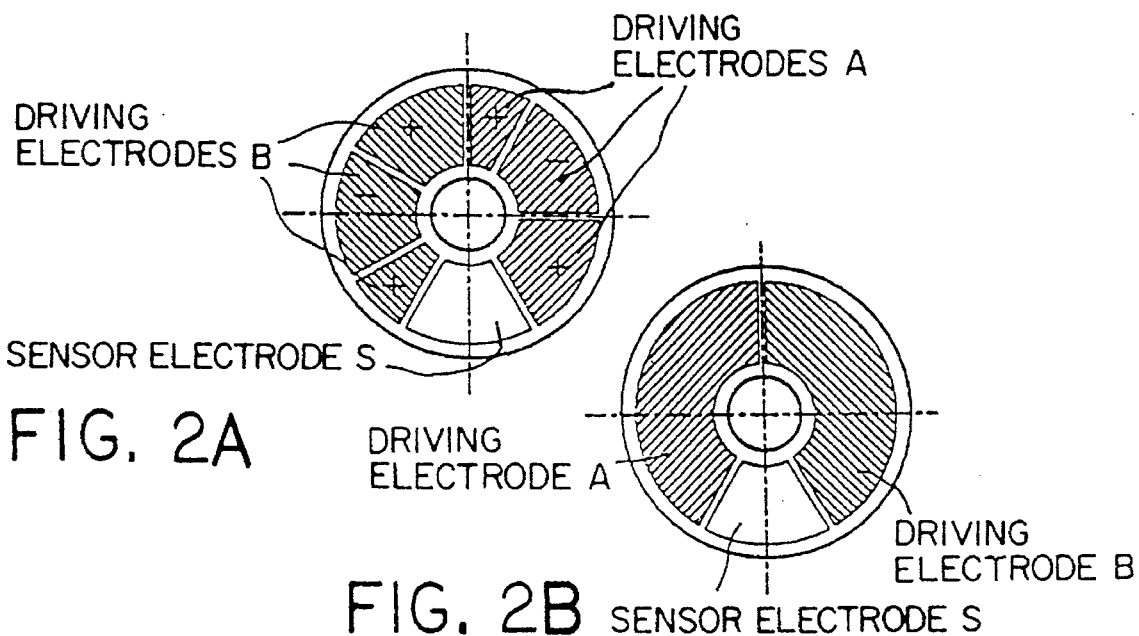
FIG. 2A
FIG. 2B

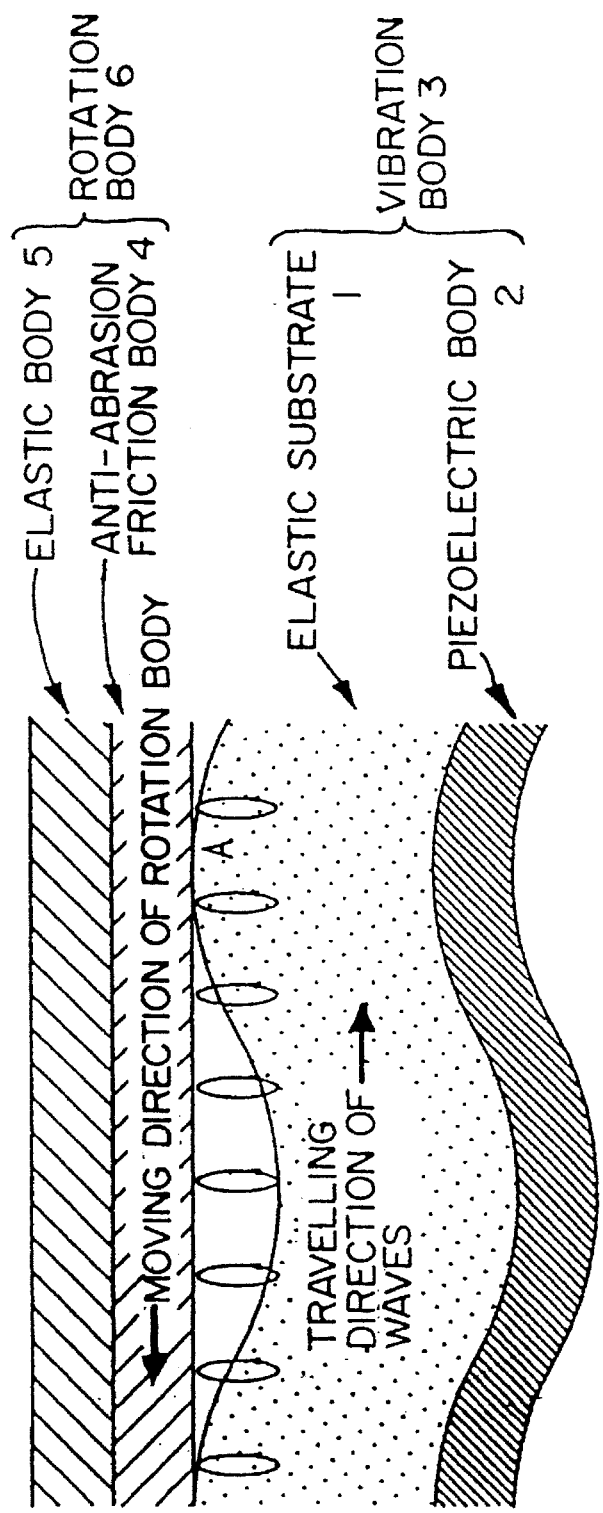
FIG. IIA
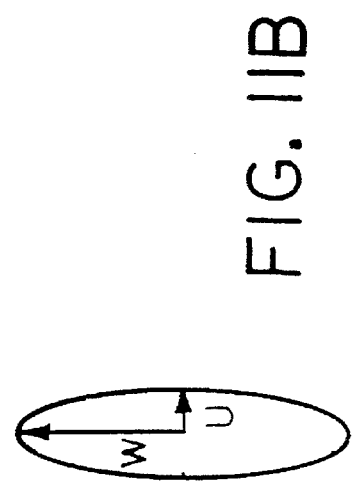
FIG. IIB

METHOD AND AN APPARATUS FOR CONTROLLING A MOVING VELOCITY OF AN ULTRASONIC MOTOR

BACKGROUND OF THE INVENTION

1. Field of the Invention

The present invention relates to a method and an apparatus for controlling the rotation velocity of an ultrasonic motor which is driven by elastic vibration caused by the piezoelectric effect of a piezoelectric body.

2. Description of the Related Art

In recent years, ultrasonic motors which have a vibration body using a piezoelectric body formed of piezoelectric ceramic or the like for converting electric energy into mechanical energy and are driven by elastic vibration of the vibration body have been a target for attention. The ultrasonic motors are available, for example, in a ring type having a ring-shaped vibration body and a disc type having a disc-shaped vibration body.

Referring to FIG. 9, a disc-type ultrasonic motor 50 will be described. FIG. 9 is a partially cut perspective view of the ultrasonic motor 50. The ultrasonic motor 50 includes a vibration body 3. The vibration body 3 includes a disc-shaped elastic substrate 1 formed of an elastic material such as metal or ceramic, and a disc-shaped piezoelectric body 2 formed of ceramic provided on one of two main surfaces of the elastic substrate 1. On the other main surface of the elastic substrate 1, projections 3a are provided for enlarging the displacement of the vibration body caused by the vibration. The ultrasonic motor 50 further includes a rotation body 6 including a friction body 4 formed of an anti-abrasion material and an elastic body 5 formed of, for example, metal or plastics. The rotation body 6 is provided on the vibration body 3 on the side of the elastic body 5 to stably apply pressure on the vibration body 3 due to a spring or the like (not shown). The friction body 4 enhances the resistance against abrasion and ensures stable contact between the rotation body 6 and the projection 3a.

The piezoelectric body 2 is provided with two sets of driving electrodes (not shown) which are positionally shifted from each other in a circumferential direction by ¼ of a wavelength of a vibration caused by the vibration body 3. When the two sets of electrodes are respectively supplied with AC voltages having a phase difference from each other by 90°, flexural vibration travelling waves are excited in the vibration body 3. The flexural vibration travelling waves have a vertical displacement distribution in the radial direction as is shown in FIG. 10A. FIG. 10B schematically illustrates the displacement distribution of the vibration body 3. There are second or greater order vibration modes in the radial direction and third or greater order vibration modes in the circumferential direction.

When the flexural vibration travelling waves are excited in the vibration body 3, given points on the surface of the vibration body 3 in contact with the rotation body 6 move along an elliptic shape. The vibration body 6 contacts the rotation body 6 only at the crests of the flexural vibration travelling waves, and moves by friction by a horizontal displacement component of the crests of the waves, thereby moving oppositely from the travelling direction of the waves. In other words, the rotation body 6 rotates around a rotation axis 7. The rotation direction of the rotation body 6 can easily be changed by changing the travelling direction of the waves by inverting the sign of the 90° phase difference between the two AC voltages applied to the two sets of driving electrodes.

The operation of the above-described ultrasonic motor 50 will be described in detail.

The two sets of driving electrodes provided on the piezoelectric body 2 are respectively supplied with voltages $V_1$ and $V_2$ having a 90° phase difference from each other expressed by Equations (1) and (2).

$$V_1 = V_0 \times \sin(\omega t) \quad (1)$$

$$V_2 = V_0 \times \cos(\omega t) \quad (2)$$

where $V_0$: the maximum voltage;

$\omega$: angular frequency; and t: time.

The two sets of driving electrodes are positionally shifted by ¼ of the wavelength of the vibration caused in the vibration body 3 as mentioned above. Accordingly, due to the application of the voltages $V_1$ and $V_2$, two standing waves expressed by Equations (3) and (4) are excited on the piezoelectric body 2. The two standing waves are positionally shifted by $\lambda/4$ and have a 90° phase difference in terms of time.

$$\xi_1 = \xi_0 \sin \omega t \cos kx \quad (3)$$

$$\xi_2 = \xi_0 \cos \omega t \sin kx \quad (4)$$

where $\xi_0$: the maximum amplitude of the flexural vibration;

k: the number of waves ($=2\pi/\lambda$); and x: the position of the coordinate in the travelling direction of the waves.

Accordingly, the flexural vibration travelling waves $\xi$ expressed by Equation (5) in the circumferential direction are excited in the vibration body 3.

$$\xi = \xi_1 + \xi_2 = \xi_0 \sin(\omega t - kx) \quad (5)$$

From Equation (5), the travelling direction of the waves can be switched simply by changing the phase difference between the voltages $V_1$ and $V_2$ to +90° or −90°. Thus, the rotation direction of the vibration body 3 can easily be changed.

FIG. 11A is a view for describing the operation principles behind the ultrasonic motor 50.

A driving force is transmitted from the vibration body 3 to the rotation body 6. The interface between the vibration body 3 and the rotation body 6 shown in FIG. 11A is described approximately by using a simplified linear model, although in practice it has a more complicated shape. When the flexural vibration travelling waves are excited on the vibration body 3, the given points on the surface of the vibration body 3 move along an ellipse having a long axis w and a short axis u as is shown in FIG. 11B. The rotation body 6 contacts the vibration body 3 at the crests of the waves (for example, point A), and is driven by friction by the horizontal displacement component of the vibration body 3, thereby moving in the opposite direction from the travelling direction of the waves at a velocity v expressed by Equation (6).

$$v = \omega \times u \quad (6)$$

Since the crests of the waves continuously move, the contact points of the vibration body 3 and the rotation body 6 also move along with time. Thus, the rotation body 6 is continuously driven to smoothly rotate.

FIG. 12 is a block diagram of a conventional circuit 60 for driving and controlling the velocity of the ultrasonic motor 50.

A variable-voltage oscillation circuit 8 generates an AC signal for driving the ultrasonic motor 50. The AC signal from the variable-voltage oscillation circuit 8 is divided into two signals. One signal is shifted in phase as predetermined (by +90° or −90°) by a phase shifter circuit 9 and is sent to a power amplifier circuit 10a. The other signal is directly sent to another power amplifier circuit 10b. The signals are amplified by the power amplifier circuits 10a and 10b respectively to a level which is sufficiently high to drive the ultrasonic motor 50. Then, the waveforms of the signals are shaped by coils 11a and 11b, and then the signals are input to two driving electrode terminals of the vibration body 3. As a result, the flexural vibration travelling waves are excited in the vibration body 3, thereby rotating the rotation body 6.

The variable-voltage oscillation circuit 8 and the phase shifter circuit 9, which operate at a low voltage, are connected to a DC power supply 13a generating a low voltage. The power amplifier circuits 10a and 10b are connected to a DC power supply 13b for generating a driving voltage which is sufficiently high to drive the ultrasonic motor 50. Instead of the power amplifier circuits 10a and 10b, a current amplifier circuit and a voltage boost transformer can be used to amplify the voltages.

An ultrasonic motor generally has resonance characteristics as other piezoelectric devices. Accordingly, as the driving frequency becomes closer to the resonant frequency, the impedance becomes lower and the current flowing through the driving terminal becomes larger. In other words, as the driving frequency becomes closer to the resonant frequency, the vibration amplitude of the vibration body becomes larger, and thus the velocity of the rotation body 6 becomes higher.

In the circuit 60 shown in FIG. 12, the velocity of the rotation body 6 is controlled by adjusting the frequency of the AC signal generated by the variable-voltage oscillation circuit 8 in accordance with a control voltage applied to a control terminal T. The velocity of the rotation body 6 is detected by a velocity detection circuit 12. Practically, the velocity is detected by a rotary encoder attached to the rotation body 6, or based on the vibration amplitude of the vibration body 3 using the principle that the velocity of the rotation body 6 is in proportion to the vibration amplitude of the vibration body 3.

FIG. 13 is a block diagram of another conventional circuit 70 for driving the ultrasonic motor 50.

A signal generated from an oscillation circuit 14 is divided into two signals. One signal is shifted in phase by a phase shifter circuit 15 by a predetermined amount and then is sent to a power amplifier circuit 17a. The other signal is directly sent to another power amplifier circuit 17b. The signals are amplified by the power amplifier circuits 17a and 17b respectively to a level which is sufficiently high to drive the ultrasonic motor 50. Then, the waveforms of the signals are shaped by coils 18a and 18b, and then the signals are input to two driving electrode terminals of the vibration body 3. As a result, the flexural vibration travelling waves are excited in the vibration body 3, thereby rotating the rotation body 6.

The oscillation circuit 14 and the phase shifter circuit 15, which operate at a low voltage, are directly connected to a DC power supply 13c generating a low voltage. The power amplifier circuits 17a and 17b, which require a DC voltage generating a sufficiently high voltage to drive the ultrasonic motor 50, is connected to the DC power supply 13c through an amplitude control circuit 16 for boosting the voltage sent from the DC power supply 13c.

In the circuit 70 shown in FIG. 13, the velocity of the rotation body 6 is controlled by detecting the velocity by a velocity detection circuit 19 and adjusting the amplitude of the driving voltage. The amplitude of the driving voltage is adjusting by changing the voltage sent to the power amplifier circuits 17a and 17b from the DC power supply 13c by the amplitude control circuit 19.

A conventional ring-shaped ultrasonic motor is described in U.S. Pat. No. 4,853,579. The ring-shaped ultrasonic motor, which uses flexural vibration travelling waves having first or greater order vibration modes in the radial direction and third or greater order vibration modes in the circumferential direction, operates by a similar principle and is controlled by a similar velocity control circuit as mentioned above.

A conventional standing wave ultrasonic motor in which the rotation body is loaded by a vibration piece to rotate, also uses a similar velocity control system.

The above-described conventional circuits for driving and controlling the velocity of an ultrasonic motor have the following problems:

Either the frequency of the two driving voltages, the amplitude of the driving voltages, and the phase difference between the driving signals is adjusted to control the velocity of the rotation body 6. In such a system, the adjustment should be done very precisely in order to control the velocity with high accuracy. This requires a highly precise variable-frequency oscillation circuit or a highly precise variable-voltage amplitude circuit, which complicates the circuitry and raises production cost.

For example, a driving apparatus for an ultrasonic motor described in Japanese Laid-Open Patent Publication No. 3-239168 includes a device for varying the driving frequency and a device for varying the driving voltage. However, the device for varying the driving frequency is provided in order to obtain the maximum efficiency of the ultrasonic motor, and thus the driving frequency is set to be around the antiresonant frequency of the ultrasonic motor under predetermined driving conditions. Accordingly, the velocity control is practically performed only by adjustment of the driving voltage.

A driving apparatus for an ultrasonic motor described in Japanese Laid-Open Patent Publication No. 4-222476 includes a device for varying the frequency and a device for varying the applied voltage. These devices are used to constantly drive the ultrasonic motor efficiently at around a resonant frequency. The driving frequency is changed so as to maintain the phase difference between the voltage of the vibration body detected by a vibration state detecting device and the voltage of a signal applied to the piezoelectric body at a constant level. The applied voltage is changed so as to maintain the above-mentioned voltage Of the vibration body (corresponding to the velocity of the rotation body) at a predetermined level. However, the driving frequency is changed to constantly drive the ultrasonic motor at a resonant frequency thereof, and therefore the velocity is practically controlled only by the adjustment of the applied voltage.

In the above-described two conventional ultrasonic motors, the driving or applied voltage should be adjusted highly precisely in order to control the velocity with high accuracy.

In order to control the velocity with high precision using a digital circuit such as a microcomputer, a large number of control bits are required to improve the resolution of the variable frequency and the variable voltage amplitude. This presents the problem of high production cost, which prevents practical use of ultrasonic motors.

SUMMARY OF THE INVENTION

A method for controlling a moving velocity of an ultrasonic motor according to the present invention is used for an ultrasonic motor having a vibration body for causing ultrasonic vibration in response to two AC driving voltage signals having a common frequency, a common amplitude and phases different from each other; and a moving body in contact with the vibration body and moved by the ultrasonic vibration. The method includes step A for detecting a velocity of the moving body; step B for comparing the velocity detected in step A with a predetermined velocity; and step C for adjusting the frequency and the amplitude of the two AC driving voltage signals based on the comparison result to allow the velocity of the moving body to be closer to the predetermined velocity.

In one embodiment of the invention, step C includes the steps of adjusting the frequency of the two AC driving voltage signals to allow the velocity of the moving body to be closer to the predetermined velocity; and then adjusting the amplitude of the two AC driving voltage signals to allow the velocity of the moving body to be further closer to the predetermined velocity.

In another embodiment of the invention, step C includes the steps of changing the frequency of the two AC driving voltage signals by an integral multiple of a fixed variable unit $\Delta f$ to allow the velocity of the moving body to be closer to the predetermined velocity; and then changing the amplitude of the two AC driving voltage signals by an integral multiple of another fixed variable unit $\Delta V$ to allow the velocity of the moving body to be further closer to the predetermined velocity.

In another embodiment of the invention, step C includes the steps of adjusting the amplitude of the two AC driving voltage signals to allow the velocity of the moving body to be closer to the predetermined velocity; and then adjusting the frequency of the two AC driving voltage signals to allow the velocity of the moving body to be further closer to the predetermined velocity.

In one embodiment of the invention, step C includes the steps of changing the amplitude of the two AC driving voltage signals by an integral multiple of a fixed variable unit $\Delta V$ to allow the velocity of the moving body to be closer to the predetermined velocity; and then changing the frequency of the two AC driving voltage signals by an integral multiple of another fixed variable unit $\Delta f$ to allow the velocity of the moving body to be closer to the predetermined velocity.

In one embodiment of the invention, the frequency of the two AC driving voltage signals is changed within the range of frequencies which are higher than the resonant frequency of the vibration body.

Alternatively, a method for controlling the moving velocity of an ultrasonic motor according to the present invention includes step A for selecting an amplitude in accordance with a predetermined velocity of the moving body among a plurality of amplitudes prepared for the two AC driving voltage signals; step B for allowing the frequency of the two AC driving voltage signals to be identical with a predetermined frequency; step C for detecting the velocity of the moving body; step D for comparing the velocity detected in step C with a predetermined velocity; step E for reducing the frequency of the two AC driving voltage signals from the predetermined frequency by an integral multiple of a fixed variable unit $\Delta f$ to allow the velocity of the moving body to be closer to the predetermined velocity; step F for repeating steps C to E; and step G for changing the amplitude of the two AC driving voltage signals from the amplitude selected in step A by an integral multiple of a fixed variable unit $\Delta V$ to allow the velocity of the moving body to be further closer to the predetermined velocity.

In one embodiment of the invention, the frequency of the two AC driving voltage signals is changed within the range of frequencies which are higher than the resonant frequency of the vibration body.

An apparatus for controlling the moving velocity of an ultrasonic motor according to the present invention includes a vibration body for causing ultrasonic vibration in response to two AC driving voltage signals having a common frequency, a common amplitude and phases different from each other; a moving body in contact with the vibration body and moved by the ultrasonic vibration; a signal generation circuit for generating the two AC driving voltage signals and supplying the vibration body with the two AC driving voltage signals; a velocity detection circuit for detecting the velocity of the moving body; and a control circuit for comparing the velocity detected by the velocity detection circuit with a predetermined velocity and adjusting the frequency and the amplitude of the two AC driving voltage signals to allow the velocity of the moving body to be closer to the predetermined velocity.

In one embodiment of the invention, the vibration body includes an elastic substrate and a piezoelectric body provided on the elastic substrate, and the piezoelectric body is provided with a plurality of electrodes for receiving the two AC driving voltage signals.

In another embodiment of the invention, the signal generation circuit includes a variable oscillation circuit for generating a first variable-frequency voltage signal; a phase shifter circuit for generating a second voltage signal in response to the first voltage signal, the second voltage signal having a phase shifted from the phase of the first voltage signal; and a power amplifier circuit for amplifying the first voltage signal and the second voltage signal. The two AC voltage signals are generated based on the first and the second voltage signals.

In another embodiment of the invention, the apparatus further includes a voltage boost circuit for changing the amplifying ratio of the power amplifier circuit in response to a control signal sent from the control circuit, thus to change the amplitude of the first and the second voltage signals.

Alternatively, a method for controlling the moving velocity of an ultrasonic motor according to the present invention includes step A for detecting the velocity of the moving body; step B for comparing the velocity detected in step A with a predetermined velocity; and step C for adjusting the frequency of and the phase difference between the two AC driving voltage signals based on the comparison result to allow the velocity of the moving body to be closer to the predetermined velocity.

In one embodiment of the invention, step C includes the steps of adjusting the frequency of the two AC driving voltage signals to allow the velocity of the moving body to be closer to the predetermined velocity; and then adjusting the phase difference between the two AC driving voltage signals to allow the velocity of the moving body to be further closer to the predetermined velocity.

In another embodiment of the invention, step C includes the steps of changing the frequency of the two AC driving voltage signals by an integral multiple of a fixed variable unit Δf to allow the velocity of the moving body to be closer to the predetermined velocity; and then changing the phase difference between the two AC driving voltage signals by an integral multiple of another fixed variable unit ΔP to allow the velocity of the moving body to be further closer to the predetermined velocity.

In another embodiment of the invention, step C includes the steps of adjusting the phase difference between the two AC driving voltage signals to allow the velocity of the moving body to be closer to the predetermined velocity; and then adjusting the frequency of the two AC driving voltage signals to allow the velocity of the moving body further to be closer to the predetermined velocity.

In another embodiment of the invention, step C includes the steps of changing the phase difference between the two AC driving voltage signals by an integral multiple of a fixed variable unit ΔP to allow the velocity of the moving body to be closer to the predetermined velocity; and then changing the frequency of the two AC driving voltage signals by an integral multiple of another fixed variable unit Δf to allow the velocity of the moving body to be further closer to the predetermined velocity.

Alternatively, a method for controlling the moving velocity of an ultrasonic motor according to the present invention includes step A for selecting a phase difference in accordance with a predetermined velocity of the moving body among a plurality of phase differences prepared between the two AC driving voltage signals; step B for allowing the frequency of the two AC driving voltage signals to be identical with a predetermined frequency; step C for detecting the velocity of the moving body; step D for comparing the velocity detected in step C with a predetermined velocity; step E for reducing the frequency of the two AC driving voltage signals from the predetermined frequency by an integral multiple of a fixed variable unit Δf to allow the velocity of the moving body to be closer to the predetermined velocity; step F for repeating steps C to E; and step G for changing the phase difference between the two AC driving voltage signals from the phase difference selected in step A by an integral multiple of a fixed variable unit ΔP to allow the velocity of the moving body to be further closer to the predetermined velocity.

In one embodiment of the invention, the frequency of the two AC driving voltage signals is changed within the range of frequencies which are higher than the resonant frequency of the vibration body.

In another embodiment of the invention, the phase difference between the two AC driving voltage signals is adjusted to be deviated from 90° by an integral multiple of the fixed variable unit ΔP.

Alternatively, an apparatus for controlling the moving velocity of an ultrasonic motor according to the present invention includes a vibration body for causing ultrasonic vibration in response to two AC driving voltage signals having a common frequency, a common amplitude and phases different from each other; a moving body in contact with the vibration body and moved by the ultrasonic vibration; a signal generation circuit for generating the two AC driving voltage signals and supplying the vibration body with the two AC driving voltage signals; a velocity detection circuit for detecting the velocity of the moving body; and a control circuit for comparing the velocity detected by the velocity detection circuit with a predetermined velocity and adjusting the frequency of and the phase difference between the two AC driving voltage signals to allow the velocity of the moving body to be closer to the predetermined velocity.

In one embodiment of the invention, the vibration body includes an elastic substrate and a piezoelectric body provided on the elastic substrate, and the piezoelectric body is provided with a plurality of electrodes for receiving the two AC driving voltage signals.

In another embodiment of the invention, the signal generation circuit includes a variable oscillation circuit for generating a first variable-frequency voltage signal; a phase shifter circuit for generating a second voltage signal in response to the first voltage signal, the second voltage signal having a phase shifted from the phase of the first voltage signal; and a power amplifier circuit for amplifying the first voltage signal and the second voltage signal. The two AC voltage signals are generated based on the first and the second voltage signals.

In another embodiment of the invention, the phase shifter circuit is a variable phase shifter circuit and shifts the phase of the second voltage signal in response to a control signal sent from the control circuit.

Thus, the invention described herein makes possible the advantages of (1) providing a highly precise velocity controlling method for an ultrasonic motor using a simple circuit structure by varying both the frequency and the amplitude of two AC voltage signals for driving the ultrasonic motor, and an apparatus used for such a method; and (2) providing a highly precise velocity controlling method for an ultrasonic motor using a simple circuit structure by varying both the frequencies of and the phase difference between two AC voltage signals for driving the ultrasonic motor, and an apparatus used for such a method.

These and other advantages of the present invention will become apparent to those skilled in the art upon reading and understanding the following detailed description with reference to the accompanying figures.

BRIEF DESCRIPTION OF THE DRAWINGS

FIG. 1 is a block diagram of an example of a driving and velocity controlling circuit for an ultrasonic motor according to the present invention.

FIG. 2A is a view illustrating a rear face of the piezoelectric body of an ultrasonic motor in the example shown in FIG. 1 provided with driving electrodes.

FIG. 2B is a view illustrating the front face of the piezoelectric body of the ultrasonic motor in the example shown in FIG. 1 provided with driving electrodes.

FIG. 11A is a view illustrating the operating principle of the disc-type ultrasonic motor.

FIG. 11B is a view showing the locus along which the given points on a surface of the vibration body move.

DESCRIPTION OF THE PREFERRED EMBODIMENTS

Hereinafter, the present invention will be described by way of illustrative examples with reference to the accompanying drawings.

EXAMPLE 1

Figure 9:
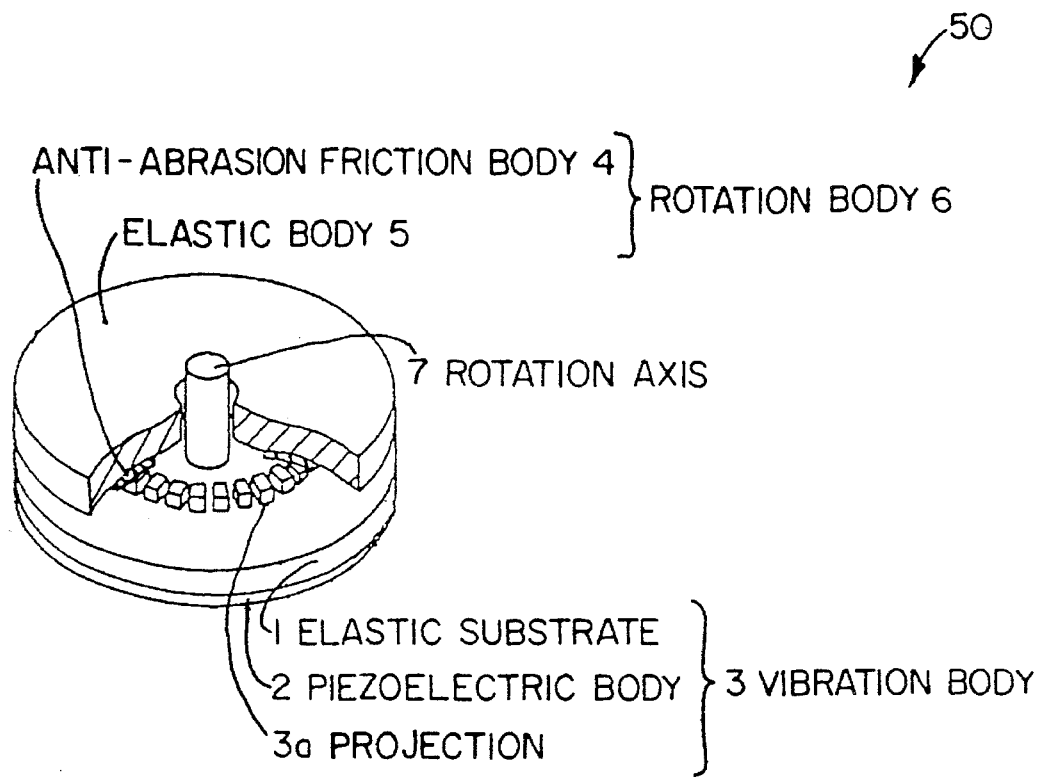
FIG. 9 is a partially cut perspective view of a disc-type ultrasonic motor.
Figure 10A:
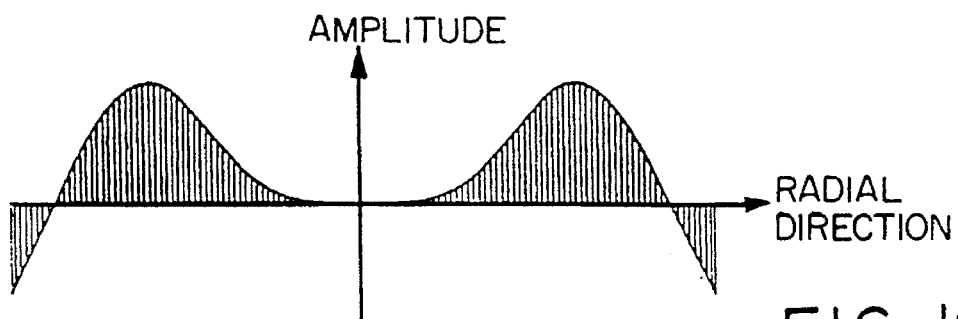
FIG. 10A is a graph illustrating a displacement distribution of the disc-type ultrasonic motor.
Figure 10B:
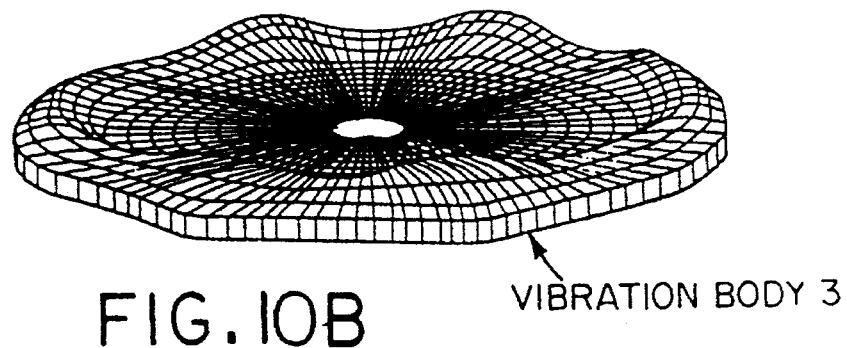
FIG. 10B is a view of the vibration body illustrating the displacement distribution thereof.
Figure 12:
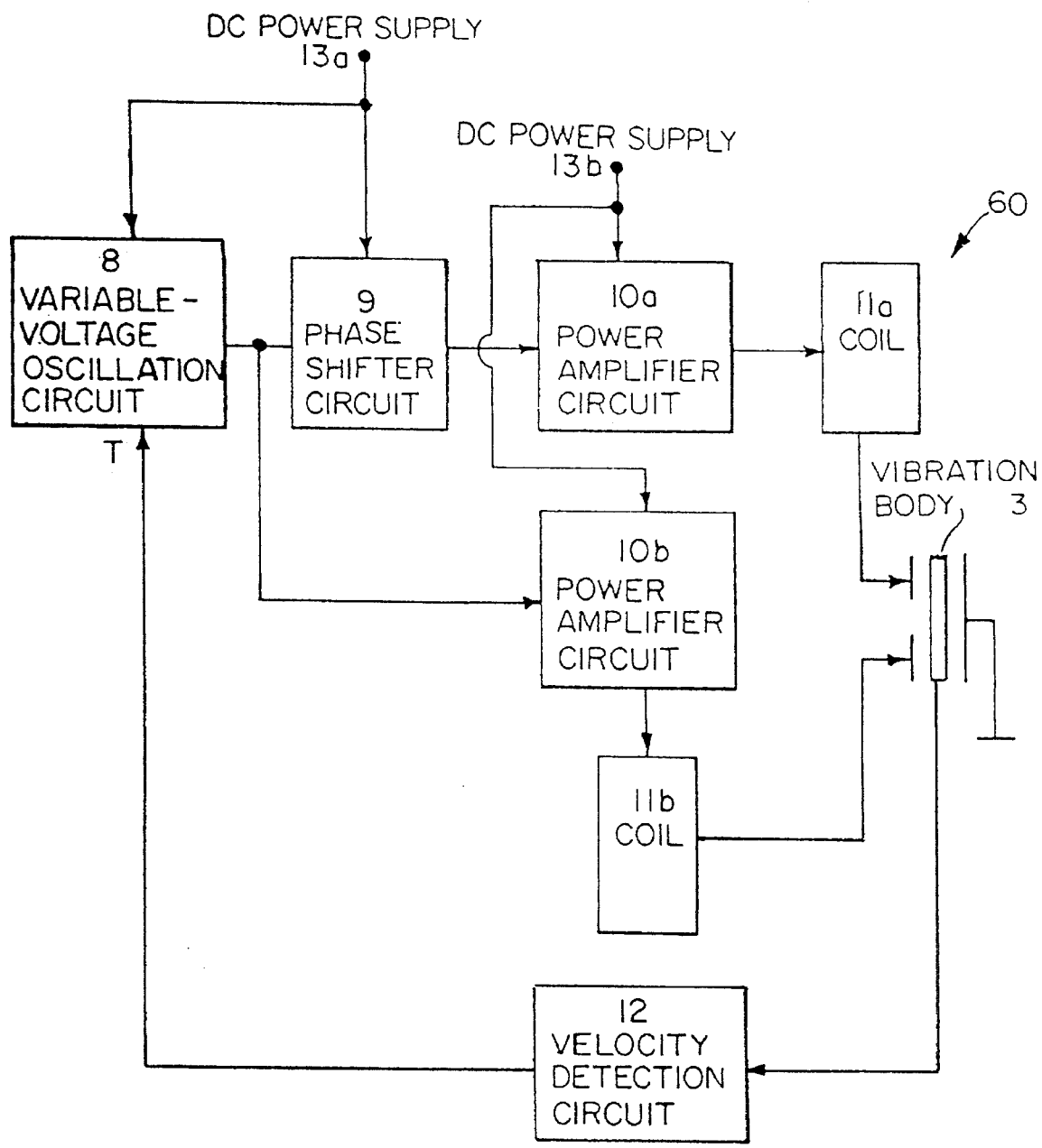
FIG. 12 is a block diagram of a conventional driving and velocity controlling circuit for the ultrasonic motor.
Figure 13:
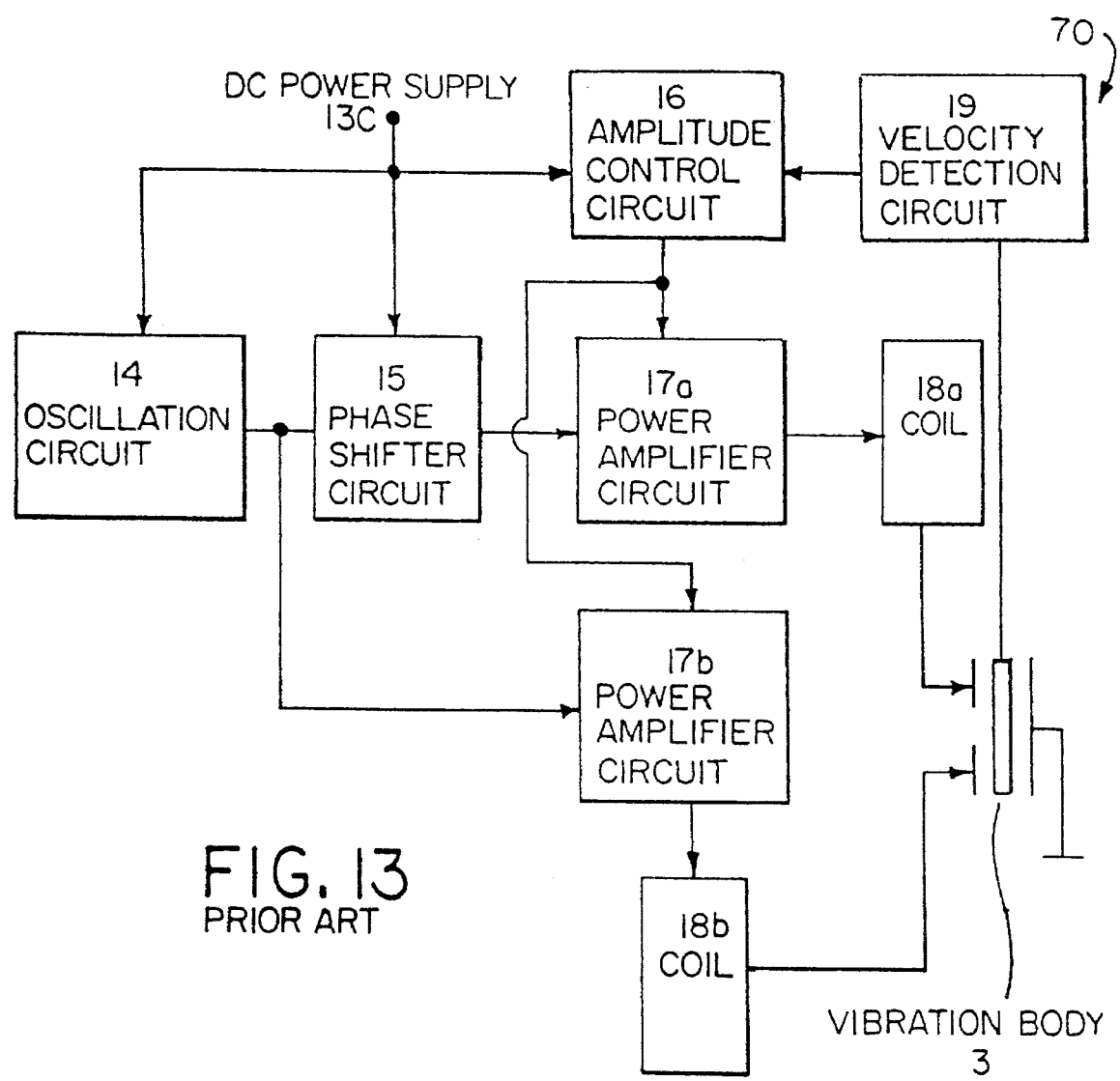
FIG. 13 is a block diagram of another conventional driving and velocity controlling circuit for the ultrasonic motor.

A first example of a driving and velocity controlling circuit for an ultrasonic motor according to the present invention will be described. The driving and velocity controlling circuit according to the present invention is used in an ultrasonic motor 50 having the structure as is illustrated in FIG. 9. FIG. 1 is a block diagram of a driving and velocity controlling circuit 80 according to the present invention.

The variable oscillation circuit 21 is a voltage-controlled oscillation circuit (VCO) for generating signals having different frequencies in accordance with the voltage applied to a control terminal T. The variable oscillation circuit 21 generates an AC voltage signal for driving the ultrasonic motor 50. The AC voltage signal output by the variable oscillation circuit 21 is divided into two signals. One signal is shifted in phase by a phase shifter circuit 22 as predetermined (for example, by +90° or −90°) and then is input to a power amplifier circuit 23. The other signal is directly input to another power amplifier circuit 24. The signals are amplified by the power amplifier circuits 23 and 24 respectively to a level which is sufficiently high to drive the ultrasonic motor 50. The waveforms thereof are shaped by coils 25 and 26, and the signals are input to two driving terminals of the vibration body 3 of the ultrasonic motor 50. As a result, flexural vibration travelling waves are excited in the vibration body 3, thereby rotating the rotation body 6.

The variable oscillation circuit 21 and the phase shifter circuit 22, which operate at a low voltage, are directly connected to a DC power supply 13d generating a low voltage. The power amplifier circuits 23 and 24, which require a DC voltage generating a sufficiently high voltage to drive the ultrasonic motor 50, is connected to the DC power supply 13d through a voltage boost circuit 20 for boosting the voltage sent from the DC power supply 13d.

A velocity of the rotation body 6 is detected by a velocity detection circuit 27. Based on the result detected by the velocity detection circuit 27, a velocity control circuit 28 adjusts the oscillation frequency from the variable oscillation circuit 21, and also controls the voltage boosting ratio of the voltage boost circuit 20 to adjust the amplitude of the driving voltage. In this manner, the velocity of the rotation body 6 is controlled to be constant with high precision.

A velocity control method performed by the above-described circuit 80 will be explained in detail, hereinafter.

In order to detect the velocity of the rotation body 6 by the velocity detection circuit 27, the following methods can be used:

(1) Using the output from a position sensor or a velocity sensor such as a rotary encoder attached to the rotation body 6.

(2) By detecting the vibration amplitude of the flexural vibration travelling waves, which is in proportion to the velocity of the rotation body 6. In more detail, the piezoelectric body 2 converts electric energy into mechanical displacement and also converts mechanical displacement to electric energy. By providing a sensor electrode for detecting the vibration amplitude on the piezoelectric body 2 of the vibration body 3, the vibration amplitude can be read as a voltage applied to the sensor electrode. The sensor electrode can be provided when providing two sets of driving electrodes on the piezoelectric body 2.

(3) The velocity of the rotation body 6 is in proportion to the vibration amplitude of the flexural vibration travelling waves excited in the vibration body 3, and the vibration amplitude of the flexural vibration travelling waves is in proportion to the mechanical current flowing into the driving electrodes of the vibration body 3. The mechanical current represents a particle velocity as a constant of an electric circuit using this principle, the velocity of the rotation body 3 is detected by reading the mechanical current.

For example, when method (2) is used, as is shown in FIGS. 2A and 2B, the piezoelectric body 2 is provided with driving electrodes A and B for exciting the flexural vibration travelling waves in the piezoelectric body 2 and also with sensor electrodes S for detecting the vibration amplitude. In this structure, the voltage of the sensor electrodes S corresponding to the vibration amplitude of the waves, namely corresponding to the velocity of the rotation body 6 is detected by the velocity detection circuit 27. Based on the detection result of the velocity detection circuit 27, the velocity control circuit 28 changes the oscillation frequency of the variable oscillation circuit 21 and simultaneously controls the voltage boosting ratio of the voltage boost circuit 20 to adjust the amplitude of the driving voltage from the power amplifier circuits 23 and 24. By such simultaneous adjustment of the oscillation frequency and the amplitude of the driving voltage, the velocity of the rotation body 6 is controlled to be at a predetermined level.

Figure 3:
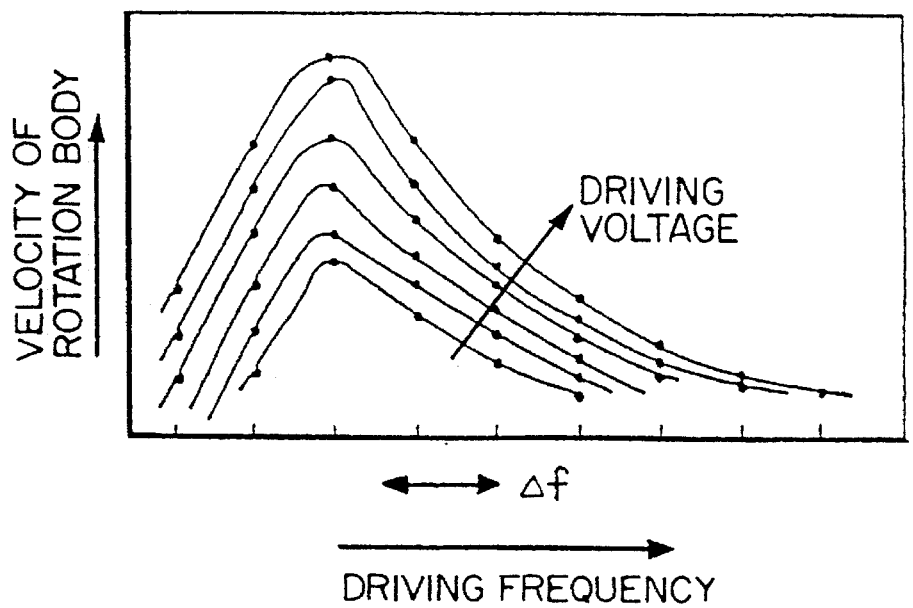
FIG. 3 is a graph illustrating the relationship between the velocity of the ultrasonic motor and the driving frequency in the example shown in FIG. 1.

FIG. 3 illustrates the change in the velocity of the rotation body 3 obtained by sweeping the driving frequency from a high frequency to a low frequency while maintaining the amplitude of the driving voltage at a constant level according to the velocity control method performed by the driving and velocity control circuit 80. The horizontal axis indicates the driving frequency, and the vertical axis indicates the velocity of the rotation body 6. Each curve shows the change with different levels of the amplitude of the driving voltage. Each curve has the peak thereof at the resonant frequency of the vibration body 3. As is apparent from FIG. 3, the velocity of the ultrasonic motor can be controlled by adjusting the amplitude of the driving voltage as well as the driving frequency.

In the .case that the velocity of the ultrasonic motor is controlled by a digital circuit such as a microcomputer, a complicated circuitry is required in order to continuously adjust the driving frequency and the amplitude of the driving voltage. Accordingly, the frequency and the amplitude are generally changed discretely. If either the frequency or the amplitude is variable, velocity control is only performed discretely with a limited resolution, and therefore precise and stable velocity control is not possible.

According to the present invention, the frequency and the amplitude are both changed, thereby enlarging the variable range of the velocity and also improving the adjustment precision (varying resolution of velocity). Further, only the frequencies higher than the resonant frequency of the vibration body 3 are used for the driving frequency. The reasons are: (1) the curves showing the velocity characteristic inclines differently below and above the resonant frequency; and (2) the operation characteristics of the ultrasonic motor are unstable below the resonant frequency.

Figure 4:
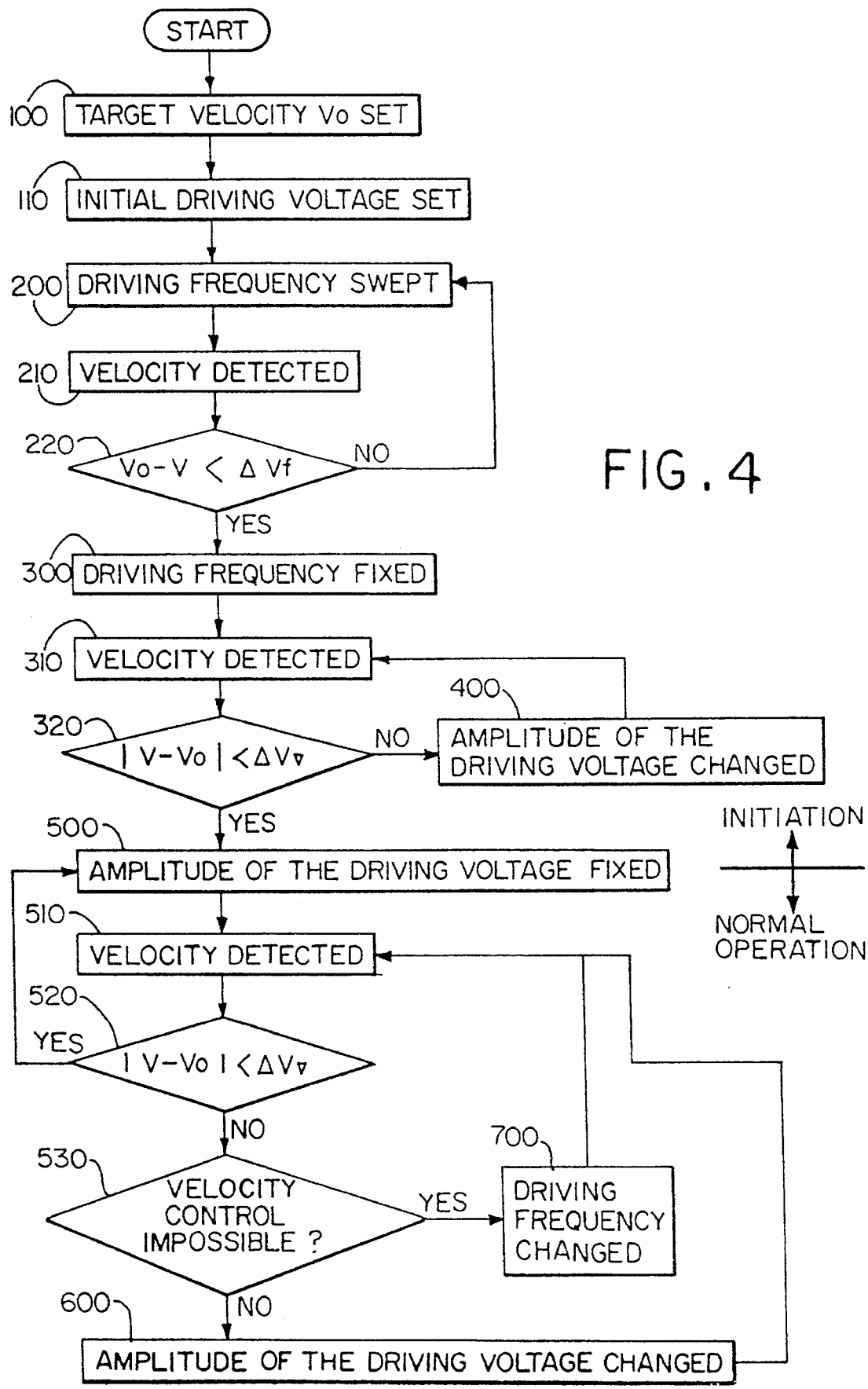
FIG. 4 is a flowchart showing a velocity controlling method using the circuit shown in FIG. 1.

The operation of the driving and velocity controlling circuit 80 shown in FIG. 1 will be described with reference to FIG. 4.

(1) Initiation

When the driving of the ultrasonic motor 50 starts (step 100), the amplitude of the AC driving signal is appropriately selected in accordance with a predetermined desirable velocity $v_0$ (target velocity) of the ultrasonic motor 50. In other words, the driving voltage is set at an appropriate initial driving level (step 110).

If the ultrasonic motor 50 is driven by a high voltage when the driving velocity is low, driving efficiency is low. By contrast, if the ultrasonic motor 50 is driven by a low voltage when the driving velocity is high, stable driving is not realized. Accordingly, the driving voltage should be set appropriately in order to realize high driving efficiency and stable driving and also to obtain the target velocity $v_0$ in a short control time. The initial driving voltage is set to be low when the target velocity $v_0$ is low and to be high when the target velocity $v_0$ is high, For example, the target velocity $v_0$ is classified into low, medium and high, and the initial driving voltage is set to be low, medium or high according to the classified level of the target velocity $v_0$. The driving starts with a frequency f which is higher than the resonant frequency of the ultrasonic motor 50 and is swept from high to low (step 200).

Then, the velocity of the rotation body 6 is detected by the velocity detection circuit 27 (step 210). The detected velocity v is compared with the target velocity $v_0$ (step 220). When the detected velocity v is smaller than the target velocity $v_0$ by more than a predetermined value $\Delta v_f$, the velocity control circuit 28 changes the voltage applied to the control terminal T to change the oscillation frequency of the variable oscillation circuit 21 (step 200). For example, the oscillation frequency is reduced by an amount obtained by multiplying $\Delta f$ by an integer ($\Delta f \times$ an integer) to raise the velocity of the ultrasonic motor 50. $\Delta f$ is a fixed variable unit of the oscillation frequency. The velocity of the rotation body 3 is again detected by the velocity detection circuit 27 (step 210). If the detected velocity v is still smaller than the target velocity $v_0$ by more than the predetermined value $\Delta v_f$ (step 220), the driving frequency is again reduced by $\Delta f \times$ an integer. The operation in steps 200, 210 and 220 is repeated until the difference between the detected velocity v and the target velocity $v_0$ becomes less than the predetermined value $\Delta v_f$. Then, the driving frequency is fixed (step 300).

The variable unit of the driving frequency, namely, the varying resolution is set to be a fixed value $\Delta f$. Accordingly, the detected velocity v cannot always be made sufficiently closer to the target velocity $v_0$ only by adjusting the driving frequency. The velocity of the rotation body 6 is again detected by the velocity detection circuit 27 (step 310). If the difference between the detected velocity v and the target velocity $v_0$ is larger than a predetermined value $\Delta v_v$, the amplitude of the driving voltage is changed by $\Delta V_x$ an integer to change the velocity (step 400). $\Delta V$ is a fixed variable unit of the amplitude of the driving voltage. $\Delta v_v$ is set to be smaller than $\Delta v_f$. Practically, if the detected velocity v is lower than the target velocity $v_0$, the amplitude of the driving voltage is enlarged by $\Delta V_x$ an integer to raise the velocity by the velocity control circuit 28. By contrast, if the detected velocity v is higher than the target velocity $v_0$, the amplitude of the driving voltage is reduced by $\Delta V \times$ an integer to lower the velocity by the velocity control circuit 28. Then, the velocity of the rotation body 6 is again detected by the velocity detection circuit 27 (step 310). When the difference between the detected velocity v and the target velocity $v_0$ is smaller than the predetermined value $\Delta v_v$, the amplitude of the driving voltage is fixed by the velocity control circuit 28 (step 500).

(2) Normal operation

After the target velocity $v_0$ is obtained in the above-described manner, the target velocity $v_0$ is maintained in normal operation as follows:

The velocity of the rotation body 6 is periodically detected by the velocity detection circuit 27 (step 510). The detected velocity v is compared with the target velocity $v_0$ (step 520). If the difference between the detected velocity v and the target velocity $v_0$ is larger than the predetermined value $\Delta v_v$, the amplitude of the driving voltage is adjusted by changing the voltage boosting ratio of the voltage boost circuit 20 (step 600). Practically, if the detected velocity v is smaller than the desirable velocity $v_0$ by more than the predetermined value $\Delta v_v$, the amplitude of the driving voltage is enlarged by $\Delta V \times$ an integer to raise the velocity. If the detected velocity v is larger than the desirable velocity $v_0$ by more than the predetermined value $\Delta v_v$, the driving voltage is reduced by $\Delta V \times$ an integer to lower the velocity. The operation in steps 510, 520 and 600 is repeated until the difference between the detected velocity v and the target velocity $v_0$ is smaller than the predetermined value $\Delta v_v$.

The variable unit of the driving frequency, namely, the varying resolution is set to be a fixed value $\Delta V$. Accordingly, the detected velocity v cannot always be made sufficiently closer to the target velocity $v_0$ only by adjusting the amplitude of the driving voltage. When the detected velocity v cannot be made closer to the target velocity $v_0$ either by enlarging or reducing the amplitude of the driving voltage (step 530), the oscillation frequency is changed by changing the voltage applied to the control terminal T by the velocity control circuit 28 (step 700). Practically, if the detected velocity v is lower than the target velocity $v_0$, the driving frequency is enhanced by $\Delta f \times$ an integer to raise the velocity. By contrast, if the detected velocity v is higher than the target velocity $v_0$, the driving frequency is reduced by $\Delta f \times$ an integer to lower the velocity. Then, the velocity of the rotation body 6 is again detected by the velocity detection circuit 27 (step 510). If the difference between the detected velocity v and the target velocity $v_0$ is more than the predetermined value $\Delta v_v$, the amplitude of the driving voltage is changed by changing the voltage boosting ratio of the voltage boost circuit 20 to make the difference between the detected velocity v and the target velocity $v_0$ within the predetermined value $\Delta v_v$.

Even if the set target velocity is changed, the same control procedure can be used for the new velocity.

In the above example, $\Delta v_v$ is set to be smaller than $\Delta v_f$. $\Delta v_v$ may be set to be larger than $\Delta v_f$, in which case, the amplitude of the driving voltage and the driving frequency are controlled in the opposite order. Needless to say, $\Delta v_v$ may be set to be almost identical with $\Delta v_f$ to control the driving frequency and the amplitude of the driving voltage in combination at the same driving step.

In the above example, the driving frequency is first adjusted and then the amplitude of the driving voltage is adjusted in the initiation process. In normal operation, the amplitude of the driving voltage is first adjusted and then the driving frequency is adjusted. Even if this order of adjustment is changed, similar control is possible by setting the values of $\Delta v_v$ and $\Delta v_f$ appropriately.

In either case, it is necessary that the driving frequency should not be lower than the resonant frequency.

As has been described, according to the present invention, the driving frequency and the amplitude of the driving voltage are both adjusted to obtain a velocity of the ultrasonic motor 50 which is most closer to the target velocity. Thus, highly precise and stable velocity control is realized.

A desirable driving frequency is obtained by voltage control using a voltage-controlled variable oscillation circuit as is shown in FIG. 1. A desirable driving frequency is alternatively obtained by using an oscillation circuit which generates a sufficiently high oscillation frequency and controlling the frequency dividing ratio of a frequency dividing circuit. In a normal driving circuit, the former is easy; and in a driving circuit using a microcomputer, the latter is easy.

Hereinafter, how to change the amplitude of the driving voltage of the ultrasonic motor 50 will be described in detail.

Figure 5:
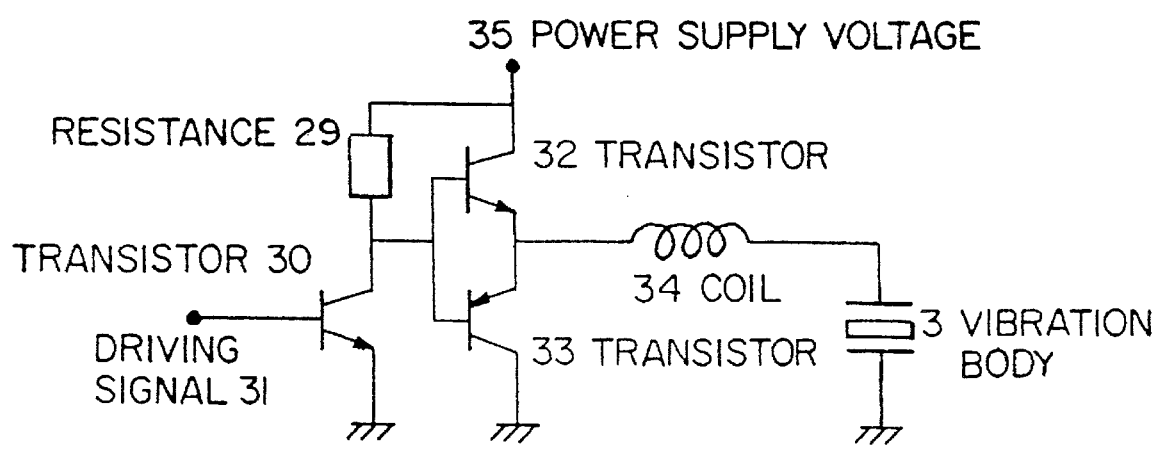
FIG. 5 is a circuit diagram for adjusting the amplitude of the driving voltage for the ultrasonic motor in the example shown in FIG. 1.

FIG. 5 is a circuit diagram for generating one of the two driving AC voltages for driving the ultrasonic motor 50. In FIG. 5, a switching circuit includes a resistance 29 and a transistor 30. When a driving signal 31 is input to the switching circuit, an AC signal is generated. The maximum amplitude of the pulse of the AC signal is determined by a power supply voltage 35. The AC signal is amplified by an SEPP circuit including transistors 32 and 33. An unnecessary high frequency component of the amplified AC signal is removed by a series resonant circuit including a coil 34 and the electric capacitance of the vibration body 3. The waveform of the AC signal is shaped to be closer to a square wave, and then the AC signal is applied to the vibration body 3 as a driving voltage.

In such a structure, the amplitude of the driving voltage can be adjusted by changing the level of the power supply voltage 35. In the circuit 80 shown in FIG. 1, the adjustment is performed by changing the voltage boosting ratio of the voltage boost circuit 20. Such adjustment is alternatively performed by changing the ON/OFF duty ratio of the driving signal 31.

EXAMPLE 2

Figure 6:
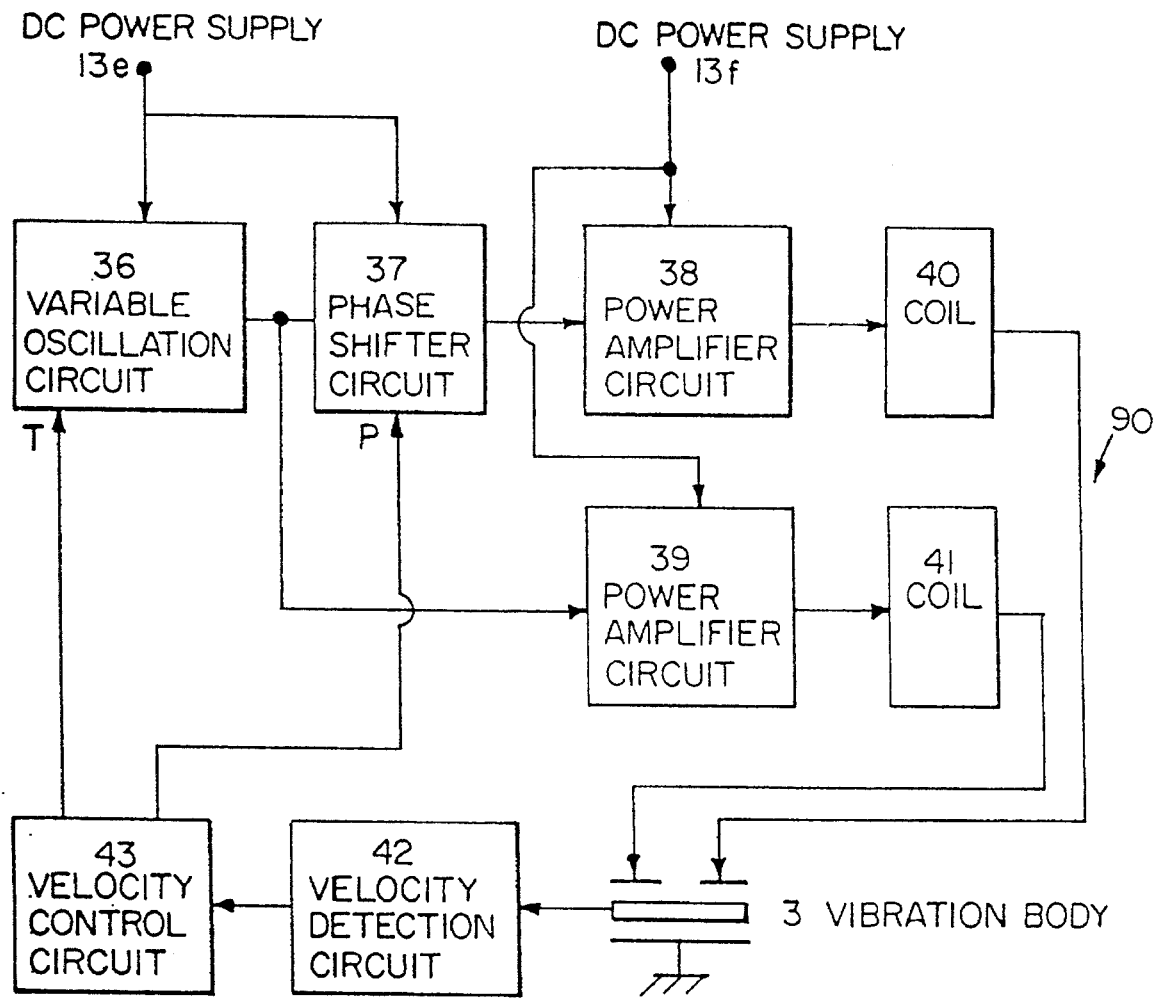
FIG. 6 is a block diagram of another example of a driving and velocity controlling circuit for an ultrasonic motor according to the present invention.

A second example of a driving and velocity controlling circuit for an ultrasonic motor according to the present invention will be described. FIG. 6 is a block diagram of a driving and velocity controlling circuit 90 according to the present invention. The driving and velocity controlling circuit according to the present invention is used in an ultrasonic motor 50 having the structure as is illustrated in FIG. 9. In the circuit 90, highly precise and stable velocity control is realized by changing the driving frequency of and the phase difference between two driving signals.

A variable oscillation circuit 36 is a voltage-controlled oscillation circuit (VCO) for generating signals having different frequencies in accordance with the voltage applied to a control terminal T. The variable oscillation circuit 36 generates an AC voltage signal for driving the ultrasonic motor 50. The AC voltage signal output by the variable oscillation circuit 36 is divided into two signals. One signal is shifted in phase by a variable phase shifter circuit 37 by a predetermined amount and then is inputted to a power amplifier circuit 38. The other signal is directly input to another power amplifier circuit 39. The amount of phase shifted by the variable phase shifter circuit 37 is adjusted by inputting a signal to a control terminal P of the variable phase shifter circuit 37.

The signals are amplified by the power amplifier circuits 38 and 39 respectively to a level which is sufficiently high to drive the ultrasonic motor 50. The waveforms thereof are shaped by coils 40 and 41, and the signals are input to two driving terminals of the vibration body 3 of the ultrasonic motor 50. As a result, flexural vibration travelling waves are excited in the vibration body 3, thereby rotating the rotation body 6.

The variable oscillation circuit 36 and the variable phase shifter circuit 37, which operate at a low voltage, are directly connected to a DC power supply 13e generating a low voltage. The power amplifier circuits 38 and 39, which require a DC voltage generating a sufficiently high voltage to drive the ultrasonic motor 50, are connected to a DC power supply 13f.

The velocity of the rotation body 6 is detected by a velocity detection circuit 42. Based on the result detected by the velocity detection circuit 42, a velocity control circuit 43 adjusts the oscillation frequency from the variable oscillation circuit 36, and also controls the amount of phase difference shifted by the variable phase shifter circuit 37. In this manner, the velocity of the rotation body 6 is controlled to be constant with high precision.

Figure 7:
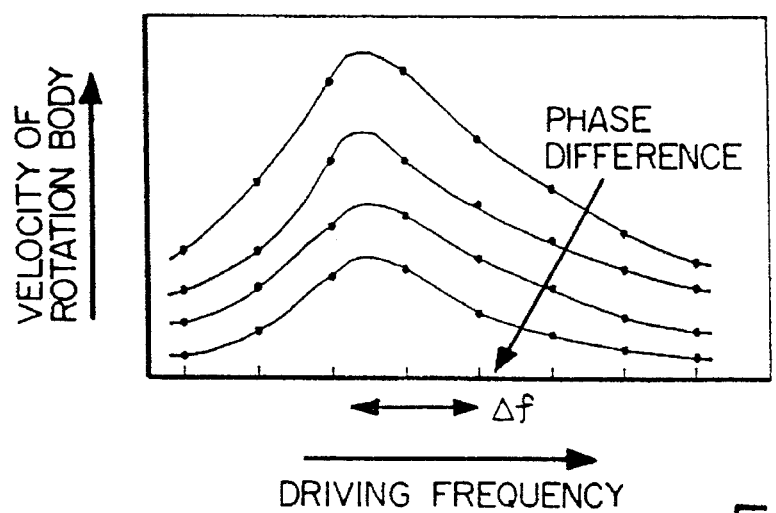
FIG. 7 is a graph illustrating the relationship between the velocity of the ultrasonic motor and the driving frequency in the example shown in FIG. 6.

FIG. 7 illustrates the change in the velocity of the rotation body 3 obtained by sweeping the driving frequency from a high frequency to a low frequency while maintaining the phase difference between the two driving voltages at a constant amount according to the velocity control method performed by the driving and velocity control circuit 90. The horizontal axis indicates the driving frequency, and the vertical axis indicates the velocity of the rotation body 6. Each curve shows the change with different amounts of phase difference. The velocity is highest when the phase difference between the two driving voltages is ±90°. As the phase difference is changed by $\Delta P\times$an integer n so as to be $\pm(90+n\Delta P)$, the velocity of the rotation body 6 is reduced. Each curve has the peak thereof at the resonant frequency of the vibration body 3. As is apparent from FIG. 7, the velocity of the ultrasonic motor can be controlled by adjusting the phase difference between the two voltages as well as the driving frequency.

According to the present invention, the frequency of and the phase difference between the two driving voltages are both changed, thereby enlarging the variable range of the velocity and also improving the adjustment precision (varying resolution of velocity). Further, only the frequencies higher than the resonant frequency of the vibration body 3 are used for the driving frequency. The reasons are: (1) the curves showing the velocity characteristic inclines differently below and above the resonant frequency; and (2) the operation characteristics of the ultrasonic motor are unstable below the resonant frequency.

Figure 8:
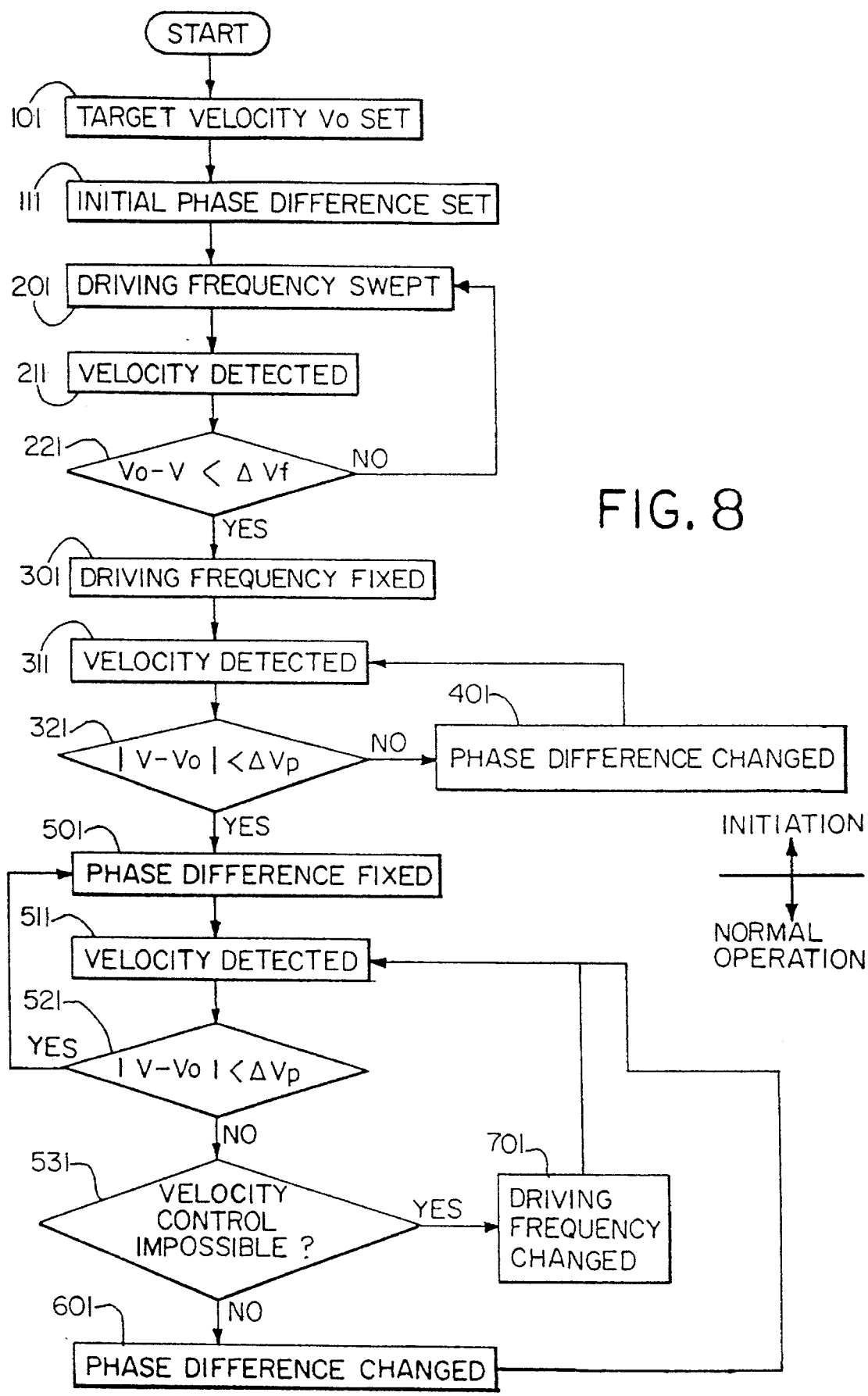
FIG. 8 is a flowchart showing a velocity controlling method using the circuit shown in FIG. 6.

The operation of the driving and velocity controlling circuit 90 shown in FIG. 6 will be described with reference to FIG. 8.

(1) Initiation

When the driving of the ultrasonic motor 50 starts (step 101), the phase difference between the two driving voltages is appropriately selected in accordance with a predetermined target velocity $v_0$ of the ultrasonic motor 50 (step 111).

In the case where the ultrasonic motor 50 is driven at a constant voltage, if the ultrasonic motor 50 is driven with a phase difference closer to ±90° when the driving velocity is low, driving efficiency is low since the driving frequency is too far from the resonant frequency. By contrast, if the ultrasonic motor 50 is driven with a phase difference far from ±90° when the driving velocity is high, stable driving is not realized since the driving frequency is too closer to the resonant frequency. Accordingly, the phase difference should be set appropriately in order to realize high driving efficiency and stable driving and also to obtain the target velocity $v_0$ in a short control time. The initial phase difference is set to be far from ±90° when the target velocity $v_0$ is low and to be closer to ±90° when the target velocity $v_0$ is high. For example, the target velocity $v_0$ is classified into low, medium and high, and the initial phase difference is set to be ±(90+3P)°, ±(90+2P)° or ±(90+P)° according to the classified level of the target velocity $v_0$. As the value of P, 10 to 20 are appropriate. The driving starts with a frequency f which is higher than the resonant frequency of the ultrasonic motor 50 and is swept from high to low (step 201).

Then, the velocity of the rotation body 6 is detected by the velocity detection circuit 42 (step 211). The detected velocity v is compared with the target velocity $v_0$ (step 221). When the detected velocity v is smaller than the target velocity $v_0$ by more than a predetermined value $\Delta v_f$, the velocity control circuit 43 changes the voltage applied to the control terminal T to change the oscillation frequency of the variable oscillation circuit 36 (step 201). For example, the oscillation frequency is reduced by $\Delta f \times$ an integer to raise the velocity of the ultrasonic motor 50. The velocity of the rotation body 6 is again detected by the velocity detection circuit 42 (step 211). If the detected velocity v is still smaller than the target velocity $v_0$ by more than the predetermined value $\Delta v_f$ (step 221), the driving frequency is again reduced by $\Delta f \times$ an integer. The operation in steps 201, 211 and 221 is repeated until the difference between the detected velocity v and the target velocity $v_0$ becomes less than the predetermined value $\Delta v_f$. Then, the driving frequency is fixed (step 301).

The variable unit of the driving frequency, namely, the varying resolution is set to be a fixed value $\Delta f$. Accordingly, the detected velocity v cannot always be made sufficiently closer to the target velocity $v_0$ only by adjusting the driving frequency. The velocity of the rotation body 6 is again detected by the velocity detection circuit 42 (step 311). If the difference between the detected velocity v and the target velocity $v_0$ is larger than a predetermined value $\Delta v_p$, the phase difference between the two driving voltages is changed by $\Delta P \times$ an integer to change the velocity (step 401). $\Delta P$ is a variable unit of the phase difference. $\Delta v_p$ is set to be smaller than $\Delta v_f$. Practically, if the detected velocity v is lower than the target velocity $v_0$, the phase difference is made more closer to ±90° by $\Delta P \times$ an integer to raise the velocity by the velocity control circuit 43. This is performed by changing the voltage applied to the control terminal P of the variable phase shifter circuit 37. By contrast, if the detected velocity v is higher than the target velocity $v_0$, the phase difference is made farther from ±90° by $\Delta P \times$ an integer to lower the velocity by the velocity control circuit 43. Then the velocity of the rotation body 6 is again detected by the velocity detection circuit 42 (step 311). When the difference between the detected velocity v and the target velocity $v_0$ is smaller than the predetermined value $\Delta v_p$, the phase difference of the driving voltage is fixed by the velocity control circuit 43 (step 501).

(2) Normal operation

After the target velocity $v_0$ is obtained in the above-described manner, the target velocity $v_0$ is maintained in normal operation as follows:

The velocity of the rotation body 6 is periodically detected by the velocity detection circuit 42 (step 511). The detected velocity v is compared with the target velocity $v_0$ (step 521). If the difference between the detected velocity v and the target velocity $v_0$ is larger than the predetermined value $\Delta v_p$, the phase difference is adjusted by changing the voltage applied to the variable phase shifter circuit 37 (step 601). Practically, if the detected voltage v is smaller than the desirable velocity $v_0$ by more than the predetermined value $\Delta v_p$, the phase difference is made more closer to ±90° by $\Delta P \times$ an integer to raise the velocity. If the detected voltage v is larger than the desirable velocity $v_0$ by more than the predetermined value $\Delta v_p$, the phase difference is made farther from ±90° by $\Delta P \times$ an integer to lower the velocity. The operation in steps 511, 521 and 601 is repeated until the difference between the detected velocity v and the target velocity $v_0$ is smaller than the predetermined value $\Delta v_p$.

The variable unit of the phase difference, namely, the varying resolution is set to be a fixed value $\Delta P$. Accordingly, the detected velocity v cannot always be made sufficiently closer to the target velocity $v_0$ only by adjusting the phase difference. When the detected velocity v cannot be made closer to the target velocity $v_0$ either by making the phase difference closer to or farther from ±90° (step 531), the oscillation frequency is changed by changing the voltage applied to the control terminal T by the velocity control circuit 43 (step 701). Practically, if the detected velocity v is lower than the target velocity $v_0$, the driving frequency is enhanced by $\Delta f \times$ an integer to raise the velocity. By contrast, if the detected velocity v is higher than the target velocity $v_0$, the driving frequency is reduced by $\Delta f \times$ an integer to lower the velocity. Then, the velocity of the rotation body 6 is again detected by the velocity detection circuit 42 (step 511). If the difference between the detected velocity v and the target velocity $v_0$ is more than the predetermined value $\Delta v_p$, the phase difference is adjusted by changing the voltage applied to the control terminal T to make the difference between the detected velocity v and the target velocity $v_0$ within the predetermined value $\Delta v_p$.

Even if the set target velocity is changed, the same control procedure can be used for the new velocity.

In the above example, $\Delta v_p$ is set to be smaller than $\Delta v_f$. $\Delta v_p$ may be set to be larger than $\Delta v_f$, in which case, the phase difference of the two driving voltages and the driving frequency are controlled the opposite order. Needless to say, $\Delta v_p$ may be set to be almost identical with $\Delta v_f$ to control the driving frequency and the phase difference between the two driving voltages in combination at a same step.

In the above example, the driving frequency is first adjusted and then the phase difference between the two driving voltages is adjusted in the initiation process. In the normal operation, the phase difference between the two driving voltages is first adjusted and then the driving frequency is adjusted. Even if this order of adjustment is changed, similar control is possible by setting the values of $\Delta v_p$ and $\Delta v_f$ appropriately.

In either case, it is necessary that the driving frequency should not be lower than the resonant frequency.

As has been described, according to the present invention, the driving frequency of and the phase difference between the two driving voltages are both adjusted to obtain a velocity for the ultrasonic motor 50 which is most closer to the target velocity. Thus, highly precise and stable velocity control is realized.

According to the present invention, the velocity of the ultrasonic motor is controlled by adjusting both the driving frequency and the amplitude of two driving voltages or by adjusting both the driving frequency of and the phase difference between two driving voltages. Thus, highly precise, stable velocity control is realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for controlling a moving velocity of an ultrasonic motor comprising vibration means for causing ultrasonic vibration in response to two AC driving voltage signals having a common frequency, a common amplitude and phases different from each other; and moving means in contact with the vibration means and moved by the ultrasonic vibration, the method comprising:

step A: detecting a velocity of the moving means;

step B: comparing the velocity detected in step A with a predetermined velocity; and step C: adjusting the frequency and the amplitude of the two AC driving voltage signals based on the comparison result, the adjustment of the frequency and the adjustment of the amplitude being combined to allow the velocity of the moving means to be closer to the predetermined velocity in that the adjusting step includes the steps of adjusting one of the frequency and amplitude of the two AC driving voltage signals to allow the velocity of the moving means to be closer to the predetermined velocity, and adjusting the other of the frequency and amplitude of the two AC driving voltage signals to allow the velocity of the moving means to be further closer to the predetermined velocity.

2. A method for controlling the moving velocity of an ultrasonic motor according to claim 1, wherein step C includes the steps of:

adjusting the frequency of the two AC driving voltage signals to allow the velocity of the moving means to be closer to the predetermined velocity; and then adjusting the amplitude of the two AC driving voltage signals to allow the velocity of the moving means to be further closer to the predetermined velocity.

3. A method for controlling the moving velocity of an ultrasonic motor according to claim 1, wherein step C includes the steps of:

changing the frequency of the two AC driving voltage signals by an integral multiple of a fixed variable unit $\Delta f$ to allow the velocity of the moving means to be closer to the predetermined velocity; and then changing the amplitude of the two AC driving voltage signals by an integral multiple of another fixed variable unit $\Delta V$ to allow the velocity of the moving means to be further closer to the predetermined velocity.

4. A method for controlling a moving velocity of an ultrasonic motor according to claim 1, wherein step C includes the steps of:

adjusting the amplitude of the two AC driving voltage signals to allow the velocity of the moving means to be closer to the predetermined velocity; and then adjusting the frequency of the two AC driving voltage signals to allow the velocity of the moving means to be further closer to the predetermined velocity.

5. A method for controlling the moving velocity of an ultrasonic motor according to claim 1, wherein step C includes the steps of:

changing the amplitude of the two AC driving voltage signals by an integral multiple of a fixed variable unit $\Delta V$ to allow the velocity of the moving means to be closer to the predetermined velocity; and then changing the frequency of the two AC driving voltage signals by an integral multiple of another fixed variable unit $\Delta f$ to allow the velocity of the moving means to be closer to the predetermined velocity.

6. A method for controlling the moving velocity of an ultrasonic motor according to claim 1, wherein the frequency of the two AC driving voltage signals is changed within the range of frequencies which are higher than a resonant frequency of the vibration means.

7. A method for controlling a moving velocity of an ultrasonic motor comprising vibration means for causing ultrasonic vibration in response to two AC driving voltage signals having a common frequency, a common amplitude and phases different from each other; and moving means in contact with the vibration means and moved by the ultrasonic vibration, the method comprising:

step A: selecting an amplitude in accordance with a predetermined velocity for the moving means among a plurality of amplitudes prepared for the two AC driving voltage signals;

step B: allowing a frequency of the two AC driving voltage signals to be identical with a predetermined frequency;

step C: detecting a velocity of the moving means;

step D: comparing the velocity detected in step C with a predetermined velocity;

step E: reducing the frequency of the two AC driving voltage signals from the predetermined frequency by an integral multiple of a fixed variable unit $\Delta f$ to allow the velocity of the moving means to be closer to the predetermined velocity;

step F: repeating steps C to E; and step G: changing the amplitude of the two AC driving voltage signals from the amplitude selected in step A by an integral multiple of a fixed variable unit $\Delta V$ to allow the velocity of the moving means to be further closer to the predetermined velocity.

8. A method for controlling the moving velocity of an ultrasonic motor according to claim 7, wherein the frequency of the two AC driving voltage signals is changed within the range of frequencies which are higher than a resonant frequency of the vibration means.

9. An apparatus for controlling a moving velocity of an ultrasonic motor, comprising:

vibration means for causing ultrasonic vibration in response to two AC driving voltage signals having a common frequency, a common amplitude and phases different from each other;

moving means in contact with the vibration means and moved by the ultrasonic vibration;

signal generation means for generating the two AC driving voltage signals and supplying the vibration means with the two AC driving voltage signals;

velocity detection means for detecting the velocity of the moving means; and control means for comparing the velocity detected by the velocity detection means with a predetermined velocity and adjusting the frequency and the amplitude of the two AC driving voltage signals based on the comparison result, the adjustment of the frequency and the adjustment of the amplitude being combined to allow the velocity of the moving means to be closer to the predetermined velocity, wherein, the control means includes means for adjusting one of the frequency and the amplitude of the two AC driving voltage signals to allow the velocity of the moving means to be closer to the predetermined velocity, and means for adjusting the other of the frequency and the amplitude of the two AC driving voltage signals to allow the velocity of the moving means to be further closer to the predetermined velocity.

10. An apparatus for controlling the moving velocity of an ultrasonic motor according to claim 9, wherein the vibration means includes an elastic substrate and a piezoelectric body provided on the elastic substrate, and the piezoelectric body is provided with a plurality of electrodes for receiving the two AC driving voltage signals.

11. An apparatus for controlling the moving velocity of an ultrasonic motor according to claim 10, wherein the signal generation means includes:

a variable oscillation circuit for generating a first variable-frequency voltage signal;

a phase shifter circuit for generating a second voltage signal in response to the first voltage signal, the second voltage signal having a phase shifted from the phase of the first voltage signal; and a power amplifier circuit for amplifying the first voltage signal and the second voltage signal, and wherein the two AC voltage signals are generated based on the first and the second voltage signals.

12. An apparatus for controlling the moving velocity of an ultrasonic motor according to claim 11, further comprising a voltage boost circuit for changing an amplifying ratio of the power amplifier circuit in response to a control signal sent from the control means, thus to change the amplitude of the first and the second voltage signals.

13. A method for controlling a moving velocity of an ultrasonic motor comprising vibration means for causing ultrasonic vibration in response to two AC driving voltage signals having a common frequency, a common amplitude and phases different from each other; and moving means in contact with the vibration means and moved by the ultrasonic vibration, the method comprising:

step A: detecting a velocity of the moving means;

step B: comparing the velocity detected in step A with a predetermined velocity; and step C: adjusting the frequency of and the phase difference between the two AC driving voltage signals based on the comparison result, the adjustment of the frequency and the adjustment of the phase difference being combined to allow the velocity of the moving means to be closer to the predetermined velocity in that the adjusting step includes the steps of adjusting one of the frequency and phase difference of the two AC driving voltage signals to allow the velocity of the moving means to be closer to the predetermined velocity, and adjusting the other of the frequency end phase difference of the two AC driving voltage signals to allow the velocity of the moving means to be further closer to the predetermined velocity.

14. A method for controlling the moving velocity of an ultrasonic motor according to claim 13, wherein step C includes the steps of:

adjusting the frequency of the two AC driving voltage signals to allow the velocity of the moving means to be closer to the predetermined velocity; and then adjusting the phase difference between the two AC driving voltage signals to allow the velocity of the moving means to be further closer to the predetermined velocity.

15. A method for controlling the moving velocity of an ultrasonic motor according to claim 13, wherein step C includes the steps of:

changing the frequency of the two AC driving voltage signals by an integral multiple of a fixed variable unit $\Delta f$ to allow the velocity of the moving means to be closer to the predetermined velocity; and then changing the phase difference between the two AC driving voltage signals by an integral multiple of another fixed variable unit $\Delta P$ to allow the velocity of the moving means to be further closer to the predetermined velocity.

16. A method for controlling the moving velocity of an ultrasonic motor according to claim 13, wherein step C includes the steps of:

adjusting the phase difference between the two AC driving voltage signals to allow the velocity of the moving means to be closer to the predetermined velocity; and then adjusting the frequency of the two AC driving voltage signals to allow the velocity of the moving means further to be closer to the predetermined velocity.

17. A method for controlling the moving velocity of an ultrasonic motor according to claim 13, wherein step C includes the steps of:

changing the phase difference between the two AC driving voltage signals by an integral multiple of a fixed variable unit $\Delta P$ to allow the velocity of the moving means to be closer to the predetermined velocity; and then changing the frequency of the two AC driving voltage signals by an integral multiple of another fixed variable unit $\Delta f$ to allow the velocity of the moving means to be further closer to the predetermined velocity.

18. A method for controlling the moving velocity of an ultrasonic motor according to claim 13, wherein the frequency Of the two AC driving voltage signals is changed within the range of frequencies which are higher than a resonant frequency of the vibration means.

19. A method for controlling the moving velocity of an ultrasonic motor according to claim 13, wherein the phase difference between the two AC driving voltage signals is adjusted to be deviated from 90° by an integral multiple of the fixed variable unit $\Delta P$.

20. A method for controlling a moving velocity of an ultrasonic motor comprising vibration means for causing ultrasonic vibration in response to two AC driving voltage signals having a common frequency, a common amplitude and phases different from each other; and moving means in contact with the vibration means and moved by the ultrasonic vibration, the method comprising:

step A: selecting a phase difference in accordance with a predetermined velocity of the moving means among a plurality of phase differences prepared between the two AC driving voltage signals;

step B: allowing a frequency of the two AC driving voltage signals to be identical with a predetermined frequency;

step C: detecting a velocity of the moving means;

step D: comparing the velocity detected in step C with a predetermined velocity;

step E: reducing the frequency of the two AC driving voltage signals from the predetermined frequency by an integral multiple of a fixed variable unit $\Delta f$ to allow the velocity of the moving means to be closer to the predetermined velocity;

step F: repeating steps C to E; and step G: changing the phase difference between the two AC driving voltage signals from the phase difference selected in step A by an integral multiple of a fixed variable unit $\Delta P$ to allow the velocity of the moving means to be further closer to the predetermined velocity.

21. A method for controlling the moving velocity of an ultrasonic motor according to claim 20, wherein the frequency of the two AC driving voltage signals is changed within the range of frequencies which are higher than a resonant frequency of the vibration means.

22. A method for controlling the moving velocity of an ultrasonic motor according to claim 20, wherein the phase difference between the two AC driving voltage signals is adjusted to be deviated from 90° by an integral multiple of the fixed variable unit $\Delta P$.

23. An apparatus for controlling a moving velocity of an ultrasonic motor, comprising:

vibration means for causing ultrasonic vibration in response to two AC driving voltage signals having a common frequency, a common amplitude and phases different from each other;

moving means in contact with The vibration means and moved by the ultrasonic vibration;

signal generation means for generating the two AC driving voltage signals and supplying the vibration means with the two AC driving voltage signals;

velocity detection means for detecting a velocity of the moving means; and control means for comparing the velocity detected by the velocity detection means with a predetermined velocity and adjusting the frequency of and the phase difference between the two AC driving voltage signals based on the comparison result, the adjustment of the frequency and the adjustment of the phase difference being combined to allow the velocity of the moving means to be closer to the predetermined velocity, wherein the control means includes means for adjusting one of the frequency and the phase difference of the two AC driving voltage signals to allow the velocity of the moving means to be closer to the predetermined velocity, and means for adjusting the other of the frequency and the the phase difference of the two AC driving voltage signals to allow the velocity of the moving means to be further closer to the predetermined velocity.

24. An apparatus for controlling the moving velocity of an ultrasonic motor according to claim 23, wherein the vibration means includes an elastic substrate and a piezoelectric body provided on the elastic substrate, and the piezoelectric body is provided with a plurality of electrodes for receiving the two AC driving voltage signals.

25. An apparatus for controlling the moving velocity of an ultrasonic motor according to claim 24, wherein the signal generation means includes:

a variable oscillation circuit for generating a first variable-frequency voltage signal;

a phase shifter circuit for generating a second voltage signal in response to the first voltage signal, the second voltage signal having a phase shifted from the phase of the first voltage signal; and a power amplifier circuit for amplifying the first voltage signal and the second voltage signal, and wherein the two AC voltage signals are generated based on the first and the second voltage signals.

26. An apparatus for controlling the moving velocity of an ultrasonic motor according to claim 25, wherein the phase shifter circuit is a variable phase shifter circuit and shifts the phase of the second voltage signal in response to a control signal sent from the control means.

* * * * *

UNITED STATES PATENT AND TRADEMARK OFFICE
CERTIFICATE OF CORRECTION

PATENT NO. : 5,461,273

DATED : October 24, 1995

INVENTOR(S) : Kawasaki et al.

It is certified that error appears in the above-identified patent and that said Letters Patent is hereby corrected as shown below:

On the title page: Item [75] Inventors:

Please add the names of the sixth and seventh inventors --Katsu Takeda and Katsumi Imada-- and change "Masanori Sumhara" to --Masanori Sumihara--.

In column 2, line 10, change "-" between "$V_1$" and "$V_o$" in Equation (1) to -- = --.

In column 4, line 55, change "Of" to --of--.

In column 10, line 62, delete "." before "case".

In column 11, line 34, change "," after "high" to --.--.

UNITED STATES PATENT AND TRADEMARK OFFICE
CERTIFICATE OF CORRECTION

PATENT NO. : 5,461,273

DATED : October 24, 1995

INVENTOR(S) : Kawasaki et al.

It is certified that error appears in the above-identified patent and that said Letters Patent is hereby corrected as shown below:

IN THE CLAIMS:

In column 19, line 10, delete "," after "wherein".

In column 20, line 47, change "Of" to --of--.

Signed and Sealed this

Twenty-third Day of July, 1996

Attest:

BRUCE LEHMAN

Attesting Officer     Commissioner of Patents and Trademarks